United States Patent
Fujimori et al.

[19]

[11] Patent Number: 6,137,243

[45] Date of Patent: Oct. 24, 2000

[54] CORRECTION OF CORRUPTED DATA IN CAPACITOR SWITCHING CONTROL TO MAINTAIN HORIZONTAL LINEARITY IN VIDEO MONITORS

[75] Inventors: Shin Fujimori; Taro Tadano; Masanobu Kimoto, all of San Diego, Calif.

[73] Assignees: Sony Corporation, Tokyo, Japan; Sony Electronics, Inc., Park Ridge, N.J.

[21] Appl. No.: 09/164,213

[22] Filed: Sep. 30, 1998

[51] Int. Cl.[7] .............................. G09G 1/04; H01J 29/56; H01J 29/70

[52] U.S. Cl. .......................... 315/370; 315/408; 315/371

[58] Field of Search ..................................... 315/370, 387, 315/408, 371; 348/807

[56] References Cited

U.S. PATENT DOCUMENTS 4,931,703 6/1990 Ogino ........................................ 315/370

*Primary Examiner*—Seungsook Ham
*Assistant Examiner*—John Patti
*Attorney, Agent, or Firm*—Blakely, Sokoloff, Taylor & Zafman LLP

[57] ABSTRACT

The present invention is a method and apparatus for selecting a capacitor value corresponding to a horizontal frequency in a video monitor. The technique determines the horizontal frequency and creates a limit on a default capacitor value which is obtained from the determined horizontal frequency. An updated value is compared with the limit to generate a comparison result. The capacitor value between the default capacitor value and the updated value is selected based on the comparison result.

16 Claims, 5 Drawing Sheets

CORRECTION OF CORRUPTED DATA IN CAPACITOR SWITCHING CONTROL TO MAINTAIN HORIZONTAL LINEARITY IN VIDEO MONITORS

BACKGROUND

1. Field of the Invention

This invention relates to video monitors. In particular, the invention relates to monitor control.

2. Description of Related Art

Multi-scan or point-scan monitors can accommodate a wide range of operating frequency. One important parameter in the performance of monitors is the horizontal scanning frequency which is related to the display resolution. For a selected display resolution, a multi-scan video monitor generates a proper horizontal frequency to the deflection driving circuit that drives the cathode ray tube (CRT). When a video monitor switches from one horizontal frequency to another to support several display resolutions, it should maintain the linearity of the deflection circuit.

The horizontal linearity of a video monitor is a performance measure to show the consistency and uniformity in the display. It is therefore important to maintain the horizontal linearity over the entire operational frequency range to keep picture distortion at the minimum. The horizontal linearity is controlled by the deflection control circuit in the monitor. One way to control the deflection control circuit is to use programmable capacitors and/or resistors to vary the time constants of the timing generator circuits, or to add a correction factor in the timing circuits. For a given set of frequencies, it is possible to calculate a corresponding set of capacitor values that should be used to control the deflection control circuit. These values form an S-correction capacitor table, usually referred to as an SCAP table.

During testing, diagnostic, or field use, the values of the capacitors may be changed to accommodate the particular video monitor or the capacitance drift due to aging and other environmental and operating conditions. To provide the flexibility of updating the SCAP table, a programmable non-volatile memory is used to store the SCAP table.

The updating of the SCAP table in the programmable memory has a number of problems. First, the updated data may be corrupted by noise in the programming of the non-volatile memory. Second, the updated data may be incorrectly chosen due to operator's mistakes. Third, the updated data may be erroneously read due to hardware failure in the communication link between the controller and the non-volatile memory. When incorrect updated values for the SCAP table are used, the deflection control circuit may generate wrong control signals that degrade the horizontal linearity of the video monitor.

Therefore there is a need in the technology to provide a simple and efficient method to provide proper capacitor values to the video control circuit to maintain horizontal linearity over the operating range of frequencies.

SUMMARY

The present invention is a method and apparatus for selecting a capacitor value corresponding to a horizontal frequency in a video monitor. The technique determines the horizontal frequency and creates a limit on a default capacitor value which is obtained from the determined horizontal frequency. An updated value is compared with the limit to generate a comparison result. The capacitor value between the default capacitor value and the updated value is selected based on the comparison result.

BRIEF DESCRIPTION OF THE DRAWINGS

The features and advantages of the present invention will become apparent from the following detailed description of the present invention in which.

DESCRIPTION

The present invention is a method and apparatus for selecting capacitor values in a control circuit for horizontal frequency control. The capacitor values are transferred from the read only memory (ROM) to the electrically erasable programmable ROM (EEPROM). The capacitor values in EEPROM are then updated according to testing and/or diagnostic results. When the discrepancy between the ROM values and the EEPROM values exceeds a frequency-dependent threshold, the default value in the ROM is selected; otherwise, the updated value in the EEPROM is selected. By limiting the updated values read from EEPROM, the control circuit avoids incorrect capacitor values caused by corrupted EEPROM data and maintain the horizontal linearity over the operating range.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
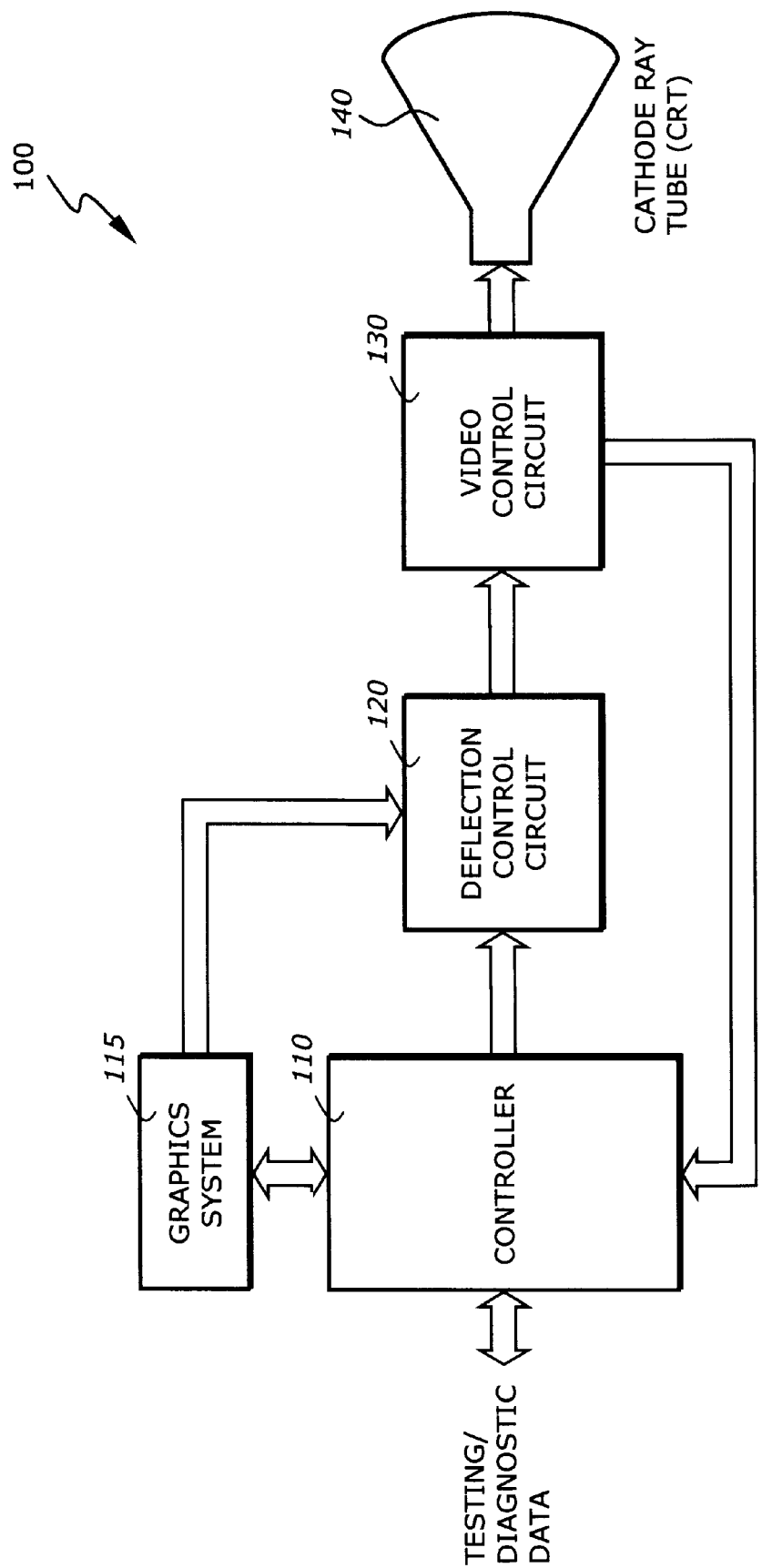
FIG. 1 is a diagram illustrating a video monitor system in which one embodiment of the invention can be practiced.

FIG. 1 is a diagram illustrating a video monitor system in which one embodiment of the invention can be practiced. The video monitor system 100 includes a controller 110, a graphics system 115, a deflection control circuit 120, a video control circuit 130, and a cathode ray tube (CRT) 140.

The controller 110 selects the proper values of the capacitors for the horizontal frequency control. The controller 110 receives information about the video operating mode from the graphics system 115 and the video control circuit 130 and configures the control function accordingly. Useful information includes horizontal and vertical scanning frequencies, drive currents, etc. The controller 110 also receives testing and diagnostic data via a communication link to a testing device or user. These testing and diagnostic data are typically entered during initial testing and during field upgrade. The controller 110 communicates with the graphics system 115 to receive video timing information generated by the graphics system such as horizontal synchronization (HSYNC) and vertical synchronization (VSYNC). The graphics system 115 generates graphic and image data for display. The graphics system 115 is coupled with the controller 110 and the deflection control circuit 120 to provide video timing information and video data. The graphics system 115 may be realized by a special graphic circuit or a video subsystem in a general-purpose computer system.

The deflection control circuit 120 receives the control parameters determined by the controller 110 and generates appropriate control signals to affect the horizontal and vertical driving circuitry. The video control circuit 130 receives the control signals from the deflection control circuit 120 and provides appropriate video control signals to the CRT 140. The video control circuit 130 also determines the operating mode of the monitor and provides monitor information to the controller 110. The CRT 140 receives the video control signals from the video control circuit 130 and drives the appropriate internal circuitry.

Figure 2:
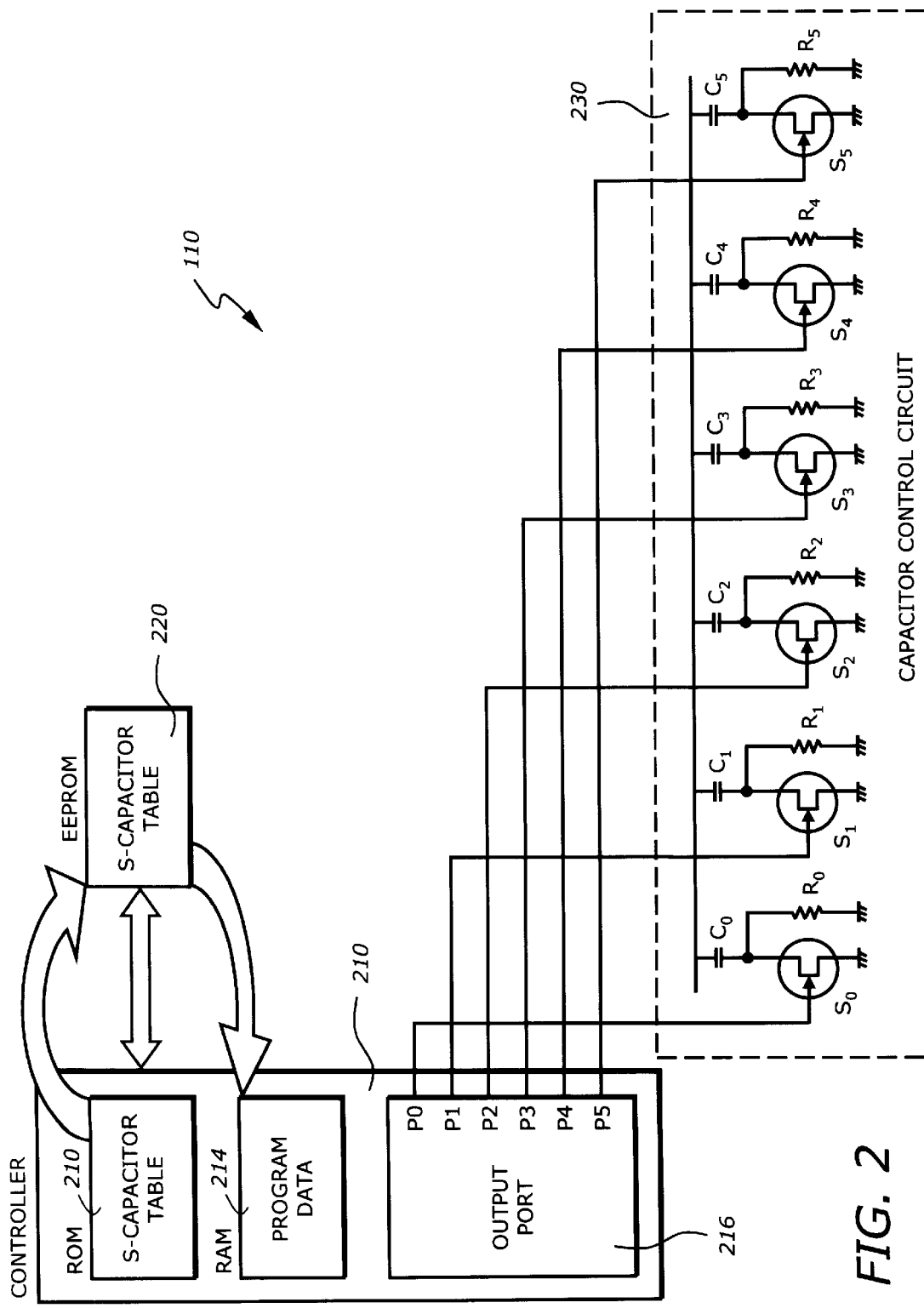
FIG. 2 is a diagram illustrating a controller according to one embodiment of the invention

FIG. 2 is a diagram illustrating a controller according to one embodiment of the invention. The controller 110 includes a microcontroller 210, a memory 220, and a capacitor control circuit 230.

The microcontroller 210 is any microprocessor. The microcontroller may be a general-purpose microcontroller having on-chip read only memory (ROM), random access memory (RAM), input/output (I/O) ports, communication interface, etc. The microcontroller 210 includes a ROM 212, a RAM 214, and an output port 216. The ROM 212 contains the program code, constant data, look-up tables, etc. The ROM 212 stores a default S-capacitor (SCAP) table. The default SCAP table stores the predetermined values of the bit patterns that correspond to the generated capacitor via the capacitor control circuit 230 in the default mode, e.g., the original mode or state of the monitor during the manufacturing stage. The RAM 214 stores program variables, temporary data, and other scratchpad data. The output port 216 provides output lines to control the switching of the capacitor values. In one embodiment, the output port 216 provides 6 output lines to connect to the capacitor control circuit 230, providing 64 discrete steps for the capacitor values.

The memory 220 is non-volatile programmable memory to store the updated SCAP table. In one embodiment, the memory 220 is an electrically erasable programmable read only memory (EEPROM). An example of such an EEPROM is a flash memory. The memory 220 stores the SCAP table transferred from the ROM upon initialization. During testing, diagnostics, or field upgrade, the contents of the memory 220 are modified and changed to reflect the latest values. By changing the memory 220 rather than changing the contents of the ROM, the updating is less costly and convenient because it is easier to change the EEPROM contents, even by remote means. However, data retained by the EEPROM are more susceptible to errors caused by noisy environment, programming glitches, and data retention reliability. The technique provided in the present invention avoids using the EEPROM data when they are within the unacceptable region as explained later.

The capacitor control circuit 230 includes a predetermined number of field effect transistor (FET) switches. The FET switches control the capacitor and resistor networks. The capacitor control circuit 230 includes six FET switches S0 through S5, six capacitors C0 through C5, and six resistors R1 through R5. FET switch S0 controls the C0 and R0 network, FET switch S1 controls the C1 and R1 network, etc. Switches S0 through S5 are controlled by the output port 216 through the output lines P0 through P5, respectively. When the output line Pi is a logical HIGH, the corresponding switch Si is turned ON shorting the capacitor Ci to ground. When the output line Pi is at a logical LOW, the corresponding switch Si is turned OFF providing a connection path from capacitor Ci to resistor Ri. As is known by one skilled in the art, alternative logic levels can be used to control the switching of the capacitor and resistor networks. By a combination of the digital value presented at the output port 216, the capacitor and resistor networks are controlled to provide different values of the overall capacitor.

Upon initialization, e.g., power on reset, the microcontroller 210 transfers the contents of the SCAP table from the ROM 212 to the memory 220 if the memory 220 has not been loaded or initialized. If the memory 220 has been loaded, then the contents of the SCAP table from the ROM 212 are not transferred to the memory 220. Then the contents of the memory 220 are transferred to the RAM 214 for used during the processing of the monitor control functions.

Figure 3:
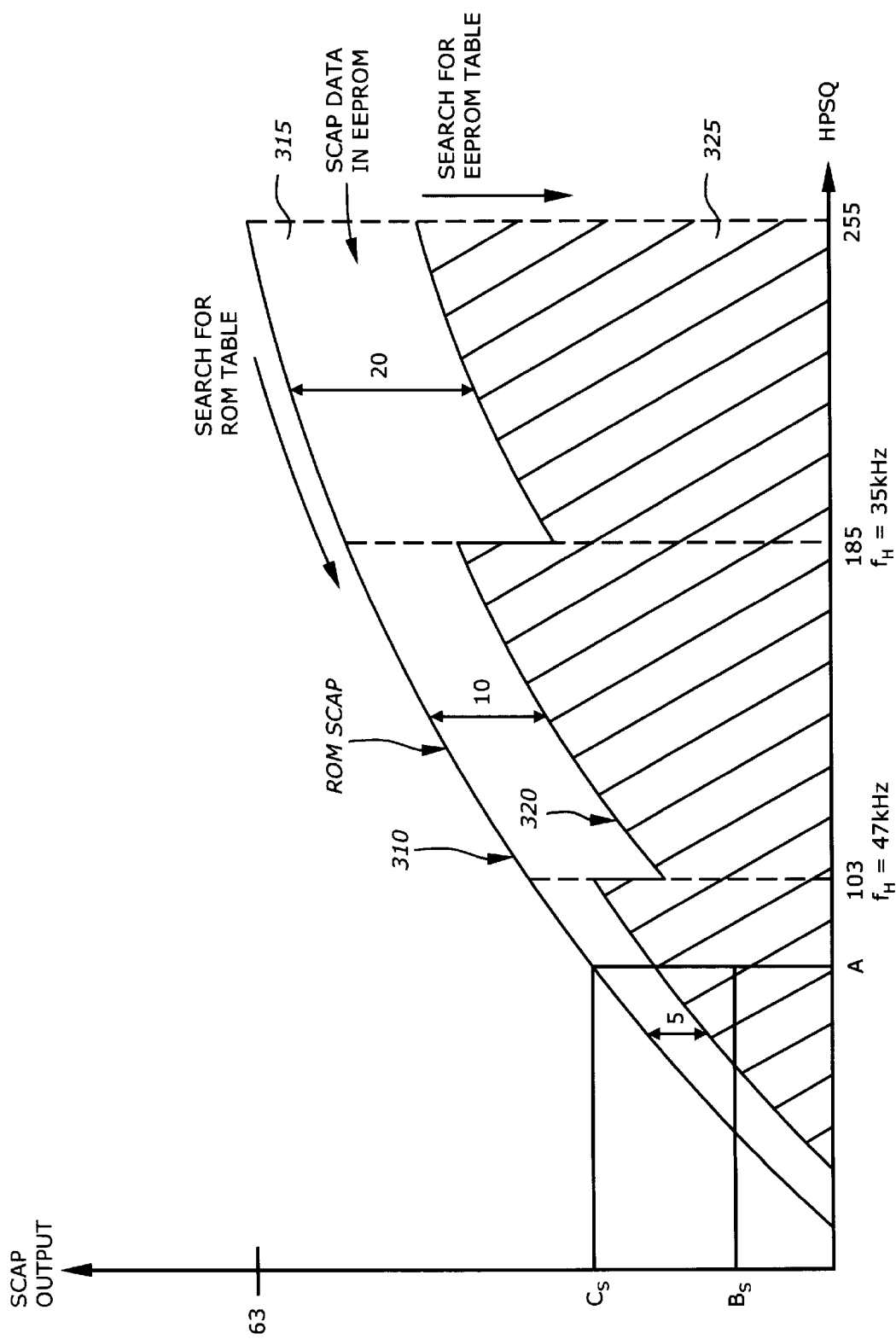
FIG. 3 is diagram illustrating capacitor selection regions according to one embodiment of the invention.

FIG. 3 is a diagram illustrating capacitor selection regions according to one embodiment of the invention. The diagram includes a ROM SCAP curve 310, a lower bound SCAP curve 320, an EEPROM SCAP region 315, and a dead region 325. The horizontal axis of the diagram is the HPSQ value which is inversely proportional to the square of the horizontal frequency. The vertical axis is the digital value of the capacitors as output to the capacitor control circuit 230 by the controller 210 via the output port 216 (FIG. 2).

The HPSQ value is computed from the horizontal frequency according to the following formula:

$$HPSQ = 229,500/(fH*fH)$$

where fH is the horizontal frequency in KHz.

The capacitor values are computed based on the horizontal frequencies given in the HPSQ values. The capacitor values are expressed in 64 steps, from 0 to 63. Each digital output to the output port of the microcontroller correspond to a capacitor value. The SCAP table is constructed based on the predetermined values of the capacitor that give proper adjustment to the horizontal linearity. An example of a SCAP table is given as follows.

| Capacitor digital value | HPSQ value |
|---|---|
| 0 | 24 |
| 1 | 28 |
| 2 | 33 |
| 3 | 41 |
| — | — |
| 60 | 208 |
| 61 | 221 |
| 62 | 240 |
| 63 | 255 |

To find the proper digital value of a capacitor for a particular horizontal frequency, the microcontroller searches through the SCAP table starting from 63 to go down to 0 and determines the corresponding HPSQ value. The digital value that gives the closest HPSQ value to the monitor's horizontal frequency will be selected and output to the capacitor control circuit 230.

The ROM SCAP curve 310 shows the default values of the capacitors expressed in terms of the 6-bit digital value as output to the capacitor control circuit 230 by the controller 210. The ROM SCAP curve 310 represents the default values of the capacitor that provides proper horizontal linearity. The ROM SCAP curve 310 will be selected to give the digital capacitor value if the EEPROM SCAP value is within the dead region 325.

The lower bound SCAP curve 320 represents the lower limit of the digital values of the capacitors below which the values are unacceptable. The lower bound SCAP curve 320 is constructed from the ROM SCAP curve 310 by an offset DELTA which is a function of the horizontal frequency, or the HPSQ value. In one embodiment, these offsets are selected as follows:

| $f_H$ (KHz) | Offset DELTA |
|---|---|
| $0 < f_H < 35$ | 5 |
| $35 < f_H < 47$ | 10 |
| $f_H > 47$ | 20 |

The EEPROM SCAP region 315 defined by the region above the lower bound SCAP curve 320 represents the acceptable EEPROM SCAP values. The dead region 325 defined by the lower bound SCAP curve 320 and the horizontal axis represents the unacceptable EEPROM SCAP values. The dead region 325 corresponds to corrupted EEPROM SCAP data and therefore should be replaced by the default values as given by the ROM SCAP curve 310.

Figure 4A:
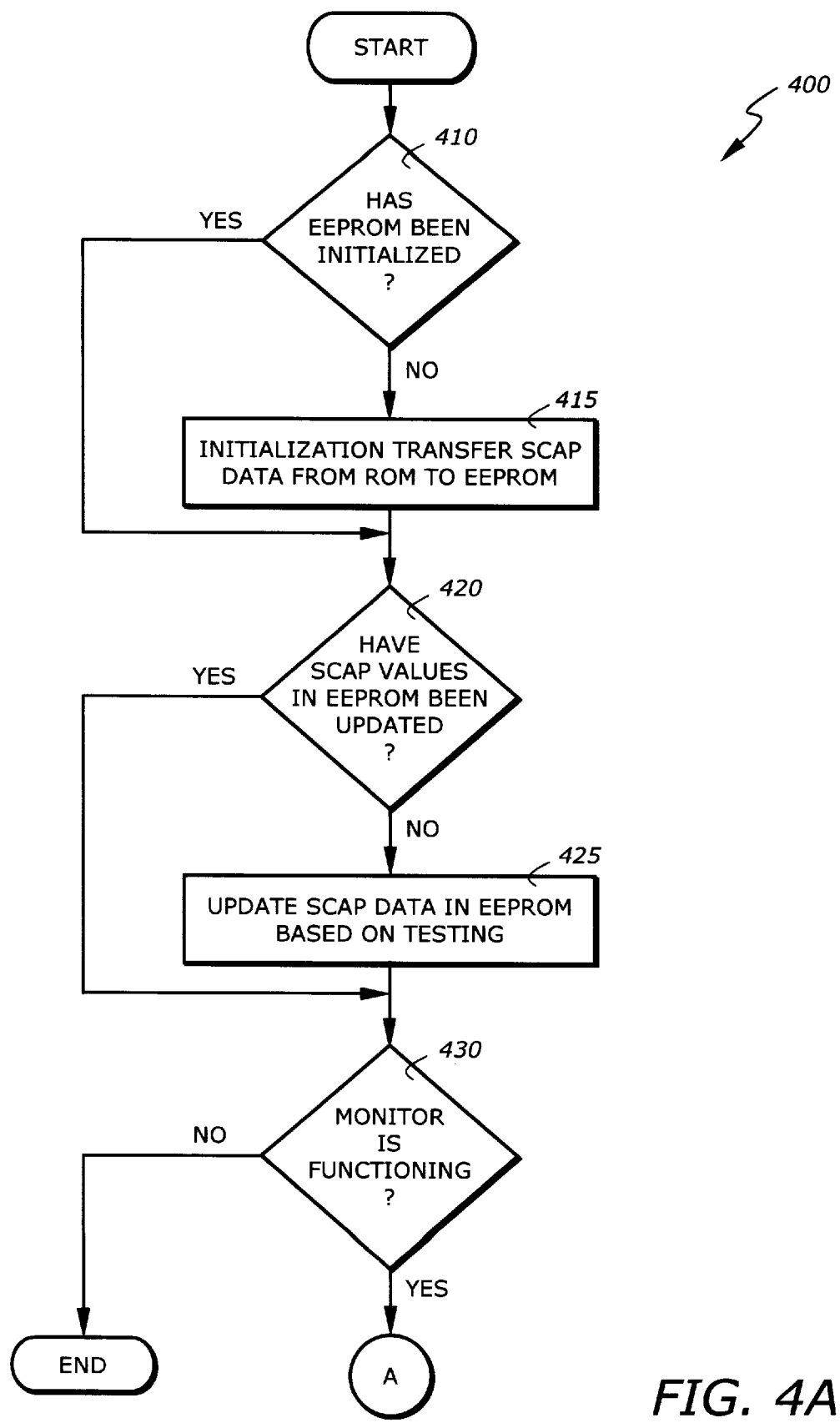
FIGS. 4A and 4B are a flowchart illustrating a process of selecting capacitor values according to one embodiment of the invention.
Figure 4B:
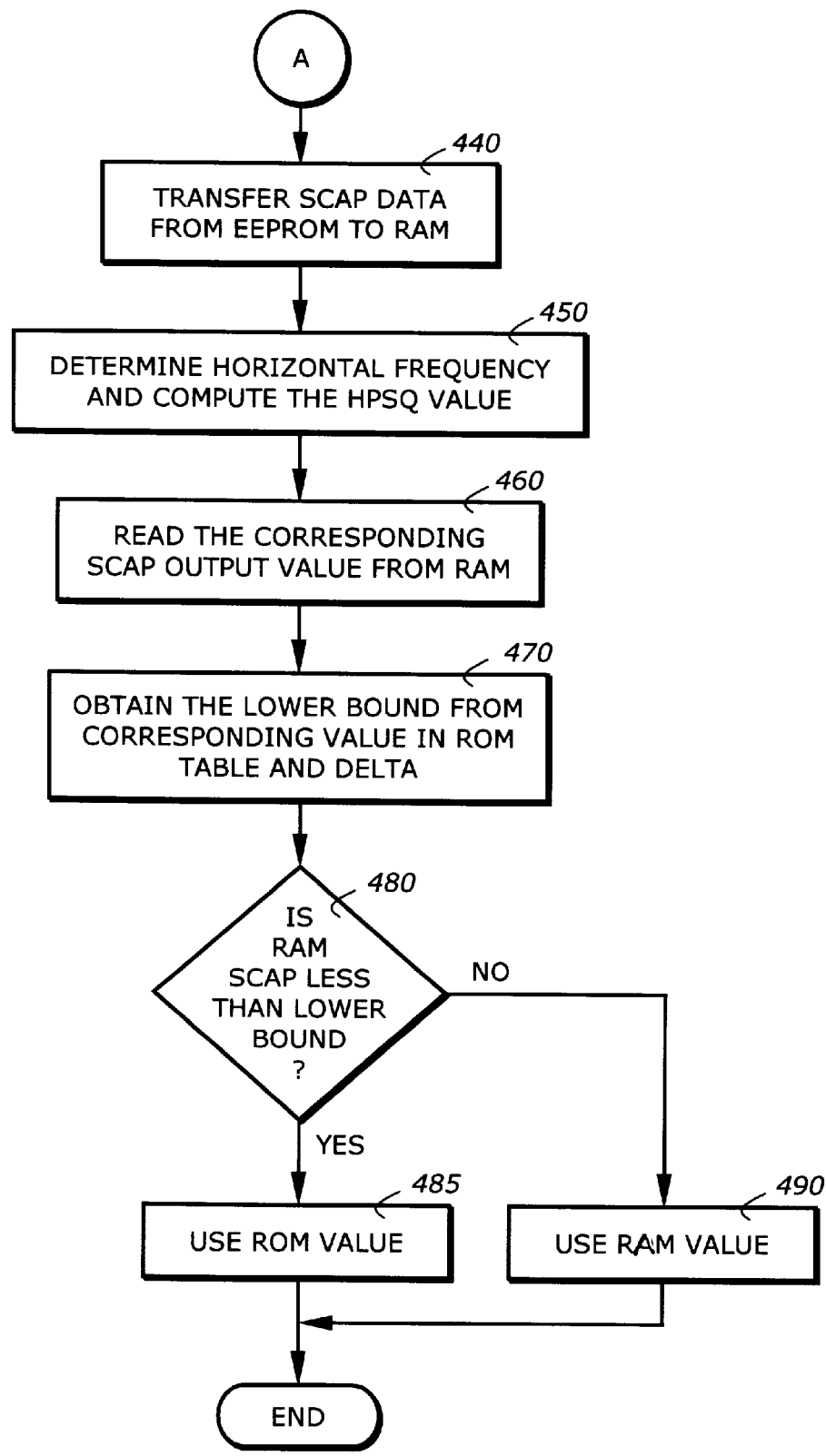

FIGS. 4A and 4B are a flowchart illustrating a process of selecting capacitor values according to one embodiment of the invention.

Upon START, the process 400 determines if the EEPROM has been initialized, i.e., if the EEPROM has be programmed to store the SCAP table or updated to store updated SCAP values (Block 410). If not, the process 400 initializes the EEPROM by transferring the SCAP data from the ROM to the EEPROM (Block 415) and proceeds to block 420. If the EEPROM has been initialized, the process 400 proceeds to block 420 to determine if the SCAP values in EEPROM have been updated. If not, the SCAP data in the EEPROM are updated according to the test or diagnostic results (Block 425) and the process 400 proceeds to block 430. If the SCAP values have been updated, the process determines if the monitor is functioning (Block 430). If not, the process 400 is terminated. If the monitor is functioning, the process 400 transfers the SCAP data from the EEPROM to the RAM in the microcontroller (Block 440).

Then the process 400 determines the horizontal frequency of the monitor and computes the HPSQ value (Block 450). Next, the process 400 reads the corresponding SCAP digital value from the SCAP table transferred from EEPROM to RAM (Block 460). Then the lower bound from the corresponding value in the ROM table is determined by subtracting the offset from the default SCAP data in the ROM (Block 470).

Then the process 400 compares the SCAP value from the RAM with the lower bound value (Block 480). If the SCAP RAM value is less than the lower bound value, the ROM SCAP value is selected and output to the capacitor control circuit. If the SCAP RAM value is greater or equal to the lower bound value, the RAM value (and therefore the EEPROM) value is selected and output to the capacitor control circuit. The process 400 is then terminated.

Therefore, the present invention provides a technique to prevent using corrupted data from EEPROM after SCAP values are updated. The technique compares the data from EEPROM with the lower bound value and use the SCAP ROM or EEPROM value depending on whether the EEPROM value is less than the lower bound value, respectively. By limiting the SCAP values and use the default values in ROM, the technique avoids degradation in the horizontal linearity of the monitor.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for selecting a capacitor value corresponding to a horizontal frequency in a video monitor, the method comprising:
    (a) determining the horizontal frequency;
    (b) creating a limit on a default capacitor value, the default capacitor value being obtained from the determined horizontal frequency;
    (c) comparing an updated value with the limit to generate a comparison result; and
    (d) selecting the capacitor value between the default capacitor value and the updated value based on the comparison result by utilizing a first memory device, a second memory device, and a processor, the selected capacitor value for controlling linearity of horizontal frequency.

2. The method of claim 1 wherein the creating the limit comprises:
    (b1) obtaining an offset value to be combined with the default capacitor value, the offset value depending on the horizontal frequency.

3. The method of claim 1 wherein the selecting the capacitor value comprises:
    (d1) selecting the default value if the comparison result indicates that the updated value exceeds the limit, otherwise selecting the updated value.

4. The method of claim 1 wherein the offset value decreases as the horizontal frequency decreases.

5. The method of claim 1 wherein the updated value is stored in an electrically erasable programmable read only memory (EEPROM).

6. The method of claim 1 wherein the default value is stored in a read only memory (ROM).

7. A method for controlling linearity of horizontal frequency in a video monitor, the method comprising:
    (a) storing a default capacitor table in a read only memory;
    (b) storing an updated capacitor table in a non-volatile memory;
    (c) providing a operational horizontal frequency to the monitor;
    (d) selecting a capacitor value corresponding to the operational horizontal frequency for controlling linearity of horizontal frequency; and
    (e) controlling a capacitor control circuit using a control value, the control value being derived from the selected capacitor value.

8. The method of claim 7 wherein the selecting the capacitor value comprises:
    (d1) determining the horizontal frequency;
    (d2) creating a limit on a default capacitor value, the default capacitor value being obtained from the determined horizontal frequency;
    (d3) comparing an updated value with the limit to generate a comparison result; and
    (d4) selecting the capacitor value between the default capacitor value and the updated value based on the comparison result.

9. The method of claim 8 wherein the creating the limit comprises:
    (d21) obtaining an offset value to be combined with the default capacitor value, the offset value depending on the horizontal frequency.

10. The method of claim 8 wherein the selecting the capacitor value comprises:

(d41) selecting the default value if the comparison result indicates that the updated value exceeds the limit, otherwise selecting the updated value.

11. An apparatus for selecting a capacitor value corresponding to a horizontal frequency in a video monitor, the apparatus comprising:
(a) a first memory to store a default capacitor value;
(b) a second memory coupled to the first memory to store an updated capacitor value;
(c) a processor coupled to the first and second memories to at least:
create a limit on a default capacitor value, the default capacitor value being obtained from the determined horizontal frequency,
compare an updated value with the limit to generate a comparison result, and
select the capacitor value between the default capacitor value and the updated value based on the comparison result for controlling linearity of horizontal frequency.

12. The apparatus of claim 11 wherein the processor creates the limit by obtaining an offset value to be combined with the default capacitor value, the offset value depending on the horizontal frequency.

13. The apparatus of claim 11 wherein the processor selects the capacitor value by selecting the default value if the comparison result indicates that the updated value exceeds the limit, otherwise selecting the updated value.

14. The apparatus of claim 11 wherein the offset value decreases as the horizontal frequency decreases.

15. The apparatus of claim 11 wherein the updated value is stored in an electrically erasable programmable read only memory (EEPROM).

16. The apparatus of claim 11 wherein the default value is stored in a read only memory (ROM).

* * * * *